United States Patent [19]

Haberl

[11] 3,853,800

[45] Dec. 10, 1974

[54] PROCESS FOR PREPARING A MIXTURE CONTAINING A BINDER MATERIAL AND POLYOLEFIN

[76] Inventor: Paul Haberl, A-2821 Klein Wolkersdorf Nr. 129, Niederosterreich, Austria

[22] Filed: Mar. 20, 1973

[21] Appl. No.: 342,942

[30] Foreign Application Priority Data
Jan. 5, 1973 Austria .................................. 93/73

[52] U.S. Cl............. 260/28.5 AS, 260/28.5 A, 260/33.6 PQ
[51] Int. Cl. ............................................. C08f 45/52
[58] Field of Search....... 260/28.5 AS, 28.5 A, 34.2, 260/897 A, 33.6 PQ, 2.3

[56] References Cited
UNITED STATES PATENTS

| | | | |
|---|---|---|---|
| 2,475,699 | 7/1949 | Derksen | 260/28.5 A |
| 3,125,548 | 3/1964 | Anderson | 260/897 A |
| 3,338,849 | 8/1967 | Johnson | 260/4 |
| 3,703,393 | 11/1972 | Koons | 260/28.5 AS |

Primary Examiner—Morris Liebman
Assistant Examiner—S. L. Fox
Attorney, Agent, or Firm—Salter & Michaelson

[57] ABSTRACT

A process for preparing a mixture based on bitumen and/or asphalt and containing maximally 10 percent polyolefins, wherein the polyolefins contain polyolefins with a molecular weight of more that 700,000 and polyolefins having a lower molecular weight, the latter serving as a solubilizer for the high molecular polyolefin. Reclaimed polyolefin may be used, preferably in the form of particles of small size, but greater than the size of powdered particles.

22 Claims, No Drawings

PROCESS FOR PREPARING A MIXTURE CONTAINING A BINDER MATERIAL AND POLYOLEFIN

The invention refers to a process for the production of a mixture based on bitumen and asphalt, respectively, for constructional purposes, particularly for road covers, floor covers or the like, containing as an essential component bitumen and, respectively, or asphalt, if desired an addition of mineral fillers, and an addition of maximally 10 percent by weight, preferably less than 8 percent by weight, of polyolefin (polyethylene and/or polypropylene) based on the weight of the bitumen and the asphalt, respectively, wherein the bitumen and the asphalt, respectively, is heated, preferably to a liquid state, and the polyolefin is as finely as possible distributed therein.

When producing such mixtures there is to be observed a segregation tendency of the polyolefin within the bitumen and asphalt, respectively. This segregation is the more pronounced the higher is the molecular weight of the polyolefin. However, it is most desired to use polyolefin of high molecular weight because the long-chain molecules of such polyolefins exert a good stiffening effect on the bitumen and the asphalt, respectively.

The invention is based on the recognition that polyolefins of low molecular weight act as a solubilizer if present within the mixture. The invention essentially consists in that high molecular weight polyolefin with a molecular weight of more than 700,000 is finely dispersed within the bitumen and asphalt, respectively, by using as a solubilizer polyolefins of low molecular weight. Thus it becomes possible to homogenously distribute and, respectively, dissolve even high molecular weight polyolefins (i.e., a polyolefin with a molecular weight of more than 700,000) within the bitumen and asphalt, respectively, so that the mixture and, respectively, solution obtained is of an essentially higher stability than known mixtures of the kind described. By counteracting any segregation tendency by means of polyolefin of lower molecular weight distributed within the bitumen and, respectively, the asphalt, no change of properties can be observed in a finished cover or the like after longer periods when exposing such a cover to conditions, which, as intense sun radiation or the like, promote segregation. It is now possible to use in road construction and in other appliances such qualities of bitumen and, respectively, asphalt which up till now could not be used with sufficient reliability on account of insufficient stiffness. Wear resistant covers in road construction can now be produced from types of bitumen having a penetration of more than 80, f.i. from bitumen B 120, bitumen B 200 and so on. Such types of bitumen are made equivalents of types of bitumen showing a lower penetration by the stiffening effect of the high molecular weight polyolefin dissolved and, respectively, dispersed therein. Like conditions are encountered with so-called casting asphalt being produced from types of bitumen having a very low value of penetration as f.i. bitumen B 10, bitumen B 20 and so on. In this case it is possible to use without further bitumen B 40 and types of bitumen having a higher penetration.

For theoretic reasons it would be most favourable to add to the bitumen and, respectively, asphalt polyolefins having a continuous spectrum of molecular weights, i.e., polyolefins containing polyolefins from the lowest conceivable molecular weight up to the highest conceivable molecular weight. An example for such a range of molecular weights would be a range extending from a molecular weight of approximately 10,000 to a molecular weight of approximately 2,000,000. In such a case the portion of polyolefins with a lower molecular weight would act as a solubilizer for the portion of polyolefins having a still higher molecular weight. Therefore, according to the invention, the solubilizer used is a mixture of polyolefins of different molecular weights, said molecular weights extending into that range of molecular weights which shows the high molecular weight polyolefin. Thus it is warranted that the range of molecular weights of the high molecular weight polyolefin is continued by the additions of polyolefins of lower molecular weight and that always a polyolefin of correspondingly lower molecular weight is present as a solubilizer for the polyolefin of higher molecular weight. For theoretic reasons it would be most favourable to continuously cover the range of molecular weights from the polyolefin of the lowest feasible molecular weight up to the highest feasible molecular weight. However, this is very difficult in practice on account of economic reasons. According to the invention, it is therefore recommended to add the polyolefin in form of molecular weight fractions having different mean molecular weights, noting that the molecular weight of these fractions extends from the lowest possible value of molecular weight, f.i. 10,000, up to that molecular weight which has the lowest molecular weight polyolefin present within the polyolefin fraction having the highest mean molecular weight. Each of these fractions has a mean molecular weight so that, in practice, it is not necessary that the ranges of molecular weights of these fractions do completely cover the total range of molecular weights extending from the lowest value possible to the highest value possible. According to the invention one can without further use as the solubilizer a mixture of polyolefins representing molecular weight fractions of different mean molecular weight, noting that between the molecular ranges of the individual fractions gaps are existing and that, however, said fractions are to be as far as possible equally distributed over the molecular weight range to be covered. If said gaps are not too large the desired effect can be attained with sufficient close approximation so that always a polyolefin fraction of lower mean molecular weight acts as a solubilizer for a polyolefin fraction of higher mean molecular weight.

It is within the spirit of the present invention to increase the percentage of the portions of the polyolefin mixture, present in a mixture according to the invention, with increasing molecular weight of said portions, particularly to exponentially increase said portion with increasing molecular weight. Thus, the preponderance of the polyolefin mixture is shifted in direction to the portions having a high molecular weight and warranted that even quite soft bitumen and, respectively, asphalt is outstandingly stiffened. In this case, the portions of low molecular weight present within the polyolefin mixture are only present in a reduced amount as compared to the amount of polyolefins of high molecular weight but this reduced amount is nevertheless sufficient for effecting a solubilizing action on the portions of lower molecular weight. For instance, it is sufficient to use the portions of polyolefins having a molecular weight of less than 500,000 in an amount of less than 25 percent by weight or in a still lower amount of the total amount of polyolefin. For distributing the portions of polyolefins in dependence of their molecular weight according to an exponential law the following equation may be used:

$$P = A \cdot 10^{a \cdot X \cdot 10^{-6}}$$

In this equation X is the molecular weight of the respective portion of polyolefins and P is the weight percentage, based on the total amount polyolefins present in the mixture, of the portion of polyolefin having the molecular weight in consideration. A is a constant having, in dependence on the final use, a value between 3 and 15, preferably 7 and 12. $a$ is a constant having, in dependence on the final use, a value between 0,4 and 0,9, preferably 0,6 and 0,85.

In view of low molecular weight polyolefins showing similarities with paraffins it is, according to the invention, to recommend to use as solubilizer also paraffins. In this case, according to the invention, the solubilizer used for the polyolefin fraction having the lowest molecular weight are aliphatic hydrocarbons having a boiling point of more than 300°C, particularly more than 350°C. Thus it is possible to replace grades of polyolefins having an extremely low molecular weight by aliphatic hydrocarbons (paraffins), the boiling point of which is being considered in view of the fact that the temperatures as usually maintained when handling inventive mixtures at the site are approximately 280°C. Thus it is avoided that the aliphatic hydrocarbons used attain too high a vapor pressure at working temperature.

According to a preferred embodiment of a process according to the invention the solubilizers used are polyolefins which have been subjected twice to a heat treatment. By such a heat treatment the molecular structure of the polyolefins is degraded automatically according too the intensity of said heat treatment, said degradation however being, as experience shows, not uniform for all individual polyolefin molecules, so that chain molecules of different length result. These chain molecules have a lower mean molecular weight than the polyolefin prior to the second heat treatment. Such polyolefins are particularly suitable solubilizers and are frequently at disposal under economically quite favourable conditions in form of by-products and, respectively, waste products of other industries. So-called reclaimed polyolefins are an example for polyolefins meeting all requirements of polyolefins used within the scope of the present invention. The term reclaimed polyolefins is used in connection with polyolefins having been at least twice subjected to a heat treatment, the final heat treatment occurring during a disintegrating process. The first heat treatment of reclaimed polyolefins already occurred when molding polyolefins for the original use, f.i. when producing foils, blown shaped bodies, bags and so on. The waste products of such molding processes and, respectively, the unuseable and, as a rule, more or less contaminated products, f.i. foils, bottles, bags and so on, are the starting materials for the reclaimed material, noting that the waste products and, respectively, the contaminated products are subjected to the second heat treatment of the polyolefins in the course of a disintegration process. In case that the mean molecular weight of the polyolefin resulting from these heat treatments is not sufficiently below the original molecular weight, the waste products and, respectively, reclaimed materials may be subjected to higher temperatures than usual f.i. 200° to 220°C when incorporating these materials into the bitumen and, respectively, the asphalt, so that the molecular structure is further partially degraded. It has been found that such reclaimed materials show better resistance against the temperatures (as a rule 230° to 250°C, occasionally even 280°C) maintained when mixing the polyolefin into the bitumen than polyolefins which are not reclaimed materials. Presumably, the reason for this phenomenon is the fact that the reclaimed materials have been decomposed to a certain extent during repeated treatment but have simultaneously obtained some valuable properties, which are not subject to a further change, so that the reclaimed material is better resistant to the relatively high temperatures prevailing when intermixing this reclaimed material with the bitumen and, respectively, the asphalt and is not or substantially not further decomposed.

There result special advantages if the polyolefin subjected to a double heat treatment contains colouring matter. This condition is, as a rule, fulfilled in most cases by a reclaimed polyolefin because on melting the waste products also colouring matter adhering to the waste product is included into the melt. Dyes and, respectively, dye batches used for dying polyolefins and, respectively, used for printing shaped bodies of polyolefins frequently contain paraffins (paraffin waxes) which thus are incorporated into the mixture containing bitumen and, respectively, asphalt and act there as solubilizers. In such a case it is not necessary to incorporate aliphatic hydrocarbons (paraffins and paraffin waxes).

According to the invention it is of advantage to use as solubilizers polyolefins which are associated with fine particles of extraneous materials preferably adhering thereto and which are being molten, then cooled and subsequently disintegrated. Such polyolefins do contain said fine particles of extraneous materials not only on the surface but also is their interior so that these particulate fine extraneous materials, which are frequently mineral particles or coloured pigments, remain in the polyolefin particles when disintegrating these particles, f.i. when homogenizing the mixture. In view of these finely particulated contaminating materials being relatively sharp-edged these contaminating materials are acting as anchors for the polyolefin particles within the bitumen and, respectively, asphalt so that a segregation is effectively counteracted. Up till now, there existed a prejudice against the use of contaminated polyolefins, because it was common opinion that the favourable properties of polyolefins exhibit a still better effect the higher the purity of the polyolefins is chosen. Purification of contaminated polyolefin was considered unprofitable. However, it has been found that contaminations contained in the polyolefins to be added to bitumen and, respectively, asphalt for producing mixtures of the kind described above are not in the least detrimental but, on the contrary, extremely advantageous. The contaminations, f.i. sand particles, dye-stuff particles, pigments and so on, adhering to the polyolefin particles do not only increase the gripping capacity of the road cover, floor cover, or the like produced by using such a mixture but also counteract any tendency of the polyolefin particles to form lumps prior to and, respectively, during incorporating such polyolefin particles into the bitumen and, respectively, asphalt. In general, it can be said that the tendency of the polyolefin particles is the lower the more the polyolefin particles are contaminated.

It has further been found that the contaminations adhering to and, respectively, being incorporated within the polyolefin particles counteract any sedimentation tendency of the polyolefin particles within the bitumen and, respectively, asphalt, so that the degree of segregation is lower and, respectively, the mixture is better stabilized than when using pure polyolefins.

Reclaimed materials produced from waste polyethylene and, respectively, polypropylene may contain substantial amounts of contaminations. For example, bags for synthetic fertilizers and consisting of polyolefins are always contaminated at their inner side by fertilizer dust frequently containg mineral substances, such substances being not soluble in bitumen and being not soluble in the polyolefin and therefore represent a mineral additive. The same applies for potatoe bags and other bags, which are frequently contaminated by soil to a greater extent. Blown hollow bodies of polyethylene and, respectively, polypropylene are frequently used as containers for surface active materials and the residues of such surface active materials within such containers contribute to the wettability of the particles of polyethylene and, respectively, polypropylene by the bitumen and, respectively, the asphalt and contribute to a better solubility of such particles in bitumen and, respectively, asphalt. Coloured matter, being the residue of imprintings on products of polyethylene and, respectively, polypropylene frequently contains pigments and thus soil constituents which also have the favourable effects mentioned above.

Such polyolefin particles may, for instance, be obtained by collecting, if desired melting, and subsequently disintegrating waste polyethylene and, respectively, polypropylene, f.i. bags, bottles, residues of foils, other residues and so on. However, care has to be taken that, when disintegrating the wastes and when agglomerating the disintegrated particles to greater particles (i.e., particles having an average particle size greater than the particle size of powder particles), the valuable properties mentioned above are not impaired. According to the invention it is advantageous to add the reclaimed polyolefin to the bitumen and, respectively, asphalt in form of flakes, chips or chaff. Such particles are produced from waste polyolefin of various origin, for example foils bags, hoses, bottles, wastes of injection molding and so on as well as tissues or webs of polyethylene and, respectively, polypropylene, by disintegrating such starting materials, f.i. in mills comprising rotating and stationary knives, noting that thereby particles are obtained having a maximum particles size of about 0,3 mm to about 60 mm, eventually up to 100 mm. Preferably particles are used which pass a sieve having round holes or rectangular holes of a dimension of 0.3 to 30 mm. If the starting materials used are foils, the thickness of the flakes is about 10 micron to 500 micron, in some cases up to 1.5 mm. The thickness of the flakes is not altered during disintegrating, but some particles are compressed while being disintegrated and creased. Such flakes and other particles obtained by tearing, grinding or pushing are those particles in which the filamentary molecules of the polyolefin are the least degraded, because when disintegrating such particles the occurring temperatures are substantially lower than the softening temperature and, respectively, the melting temperature. Greater flakes are not so easy flowable as f.i. granulate but have a great surface in relation to its volume, so that access of the bitumen and, respectively, asphalt to the individual polyolefin particles and homogeneous dissolution of these particles in the bitumen and, respectively, asphalt is favoured.

A further possibility to add the reclaimed polyolefin to the bitumen and, respectively, asphalt consists in adding the polyolefin in form of agglomerates. Such agglomerates are produced from flakes by agglomerating such flakes obtained by disintegrating in a consolidator under the influence of heat (frequently heated air or steam) and of rotating knives, so that the flakes are shrunk and from more compact particles having the form of grains. As a rule, in doing so, adjacent particles do not adhere so that lump formation can not be observed. The individual particles (agglomerate) have, as a rule, a maximum dimension of about 0.3 mm to about 50 mm, with the particle size of the main proportion being between 1 and 30 mm, however, in individual cases can be reduced to about 0.2 mm and, respectively, increased to 100 mm. The shape of the particles is irregular and strongly deformed. The surface of the particles is rough. A degradation of the polyolefin generally takes only place on the surface of the particles during heat treatment thereof. The contaminations adhering on the flakes appear as a whole on the surface of the agglomerate. Such agglomerates have a higher bulk weight and are better flowable than flakes.

According to the invention, the reclaimed polyolefin may, if desired, be added to the bitumen and, respectively, asphalt also in form of granulates. Such granulates are, as a rule, produced by extruding polyolefins brought into a liquid and, respectively, pasty condition through nozzles and subsequently subdividing the cooled extrudate into short particles. The shape of such particles is cylindrical (granulated filaments) or corresponds to the shape of a parallelepiped and, respectively, a cube (granulated tapes) or corresponds to the shape of lentils (lentil granulate) and depends on the cross section of the extruder opening and the type of the tools used for subdividing the extrudate. The maximum dimensions of such granulates is between about 0.3 mm and about 20 mm, in single cases up to 40 mm, frequently only between 0.3 and 8 mm. Such granulates contain, as a rule, an unavoidable amount of dust with a particle size lower than 0.3 mm, but the content of such granulates in dust particles should not exceed 5 percent.

Granulates and also agglomerates the particularly flowable.

Reclaimed materials of the kind described above frequently contain anorganic or organic colouring matter and are therefore tinted. Such colouring matters do not have any adverse influence on the properties of a mixture produced of such reclaimed polyolefins and bitumen and, respectively, asphalt. The colour of this colouring matter is conceiled by the black colour of the bitumen and, respectively, asphalt.

Frequently such reclaimed materials represent not only a mixture of polyolefins having different molecular weights but represent also a mixture of different types of polyolefins, which include according to the invention, first of all, polyethylene and polypropylene. The latter may be used in form of atactic as well as in form of isotactic polypropylene.

The invention is applicable for general construction purposes, i.e., for producing covers, particularly floor covers and road covers, f.i. casting asphalt.

The usual mixing ratio of the bitumen and, respectively, asphalt, at the one hand, and the fillers and, respectively aggregate (in most cases minerals), at the other hand, is not substantially influenced by adding polyolefins. However, there exists the possibility to use additives and, respectively, fillers of lower quality as has been possible up till now, because such materials are substantially better bound together by the added polyolefin.

Mixing of the polyethylene and, respectively, polypropylene with the bitumen and, respectively, asphalt can be effected in kettles at a temperature of approximately 180 to 280°C, preferably about 250°C, homogenizing being effected by stirrers or the like. The higher the mixing temperature the shorter can be selected the mixing period, however, temperatures exceeding about 280°C should not be used so that the polyolefins will not be degraded too extensively and the bitumen and, respectively, the asphalt will be preserved. It is recommanded to preheat mineral aggregates (gravel, sand, crushed rock, limestone flour and so on) to a temperature of approximately 180° to 220°C prior to be added to the mixture so that the bitumen and, respectively, asphalt is not cooled when adding the aggregates.

As already mentioned the particle size of the particles used according to the invention is substantially greater than the usual particle size of powder particles. on the other hand, the particle size of the polyolefin particles used within the scope of the present invention is not so great that these particles could not be dragged by a strong air draught, particularly if only relatively short distances must be covered. Therefore, according to the invention, it is possible to supply the polyolefin into a bath of molten bitumen and, respectively, asphalt by means of an air stream directed onto or into the bath. This stream of air has a dual function. On the one hand, this stream of air represents the transport vehicle for the polyolefin and, on the other hand, has an effect an increase of the quality of the bitumen which is blown when introducing the air. It is therefore possible to use low grade types of bitumen. As a whole, the invention provides the possibility to improve the quality of low-quality bitumen and, respectively, asphalt by adding polyolefins to such an extent that such bitumen or asphalt can also be used for high-quality application purposes. For instance, it is possible to stiffen a bitumen having a high penetration value by adding polyolefins such that a mixture is obtained which is sufficient hard but not brittle.

Evidently, also other mixing methods, also known methods, can be used. When producing melted asphalt it is, for instance, advantageous to add the polyolefins to the asphalt prior to, during or after adding the mineral fillers (gravel, sand, limestone flour and so on). When working in this manner the necessary mixing periods are relatively long and last about 1 to 20 hours. The mixing temperature is about 230°C and thus approximately equal to the temperature (230° to 260°C) of placing the asphalt.

Mixtures for road construction purposes are produced at temperatures from about 170° to 250°C either by spraying bitumen and polyolefin, if desired together with fine particles of mineral fillers, simultaneously in a molten condition via nozzles in a mixer onto the remaining mineral fillers and intensely mixing the resulting mixture for 45 to 60 seconds or by first producing a concentrated mixture containing more than 8 percent by weight polyolefin in bitumen and, respectively, asphalt and then spraying the mixture obtained onto the mineral fillers, noting that the sprayed mixture may be diluted prior or after spraying the mixture onto the mineral fillers until the weight percent proportion in polyolefins is maximally 8 percent.

According to the invention it is favourable to add the polyolefins to the bitumen and, respectively, asphalt at the same time as or after adding the mineral additives, because in this case the grinding action of the mineral additives can be made use to subdivide the polyolefin particles, what contributes to facilitating the production of a homogenous mixture. Furthermore, the mineral fillers provide a barrier which prevents any seggregation of the mixture and contributes to the stabilization of the mixture.

In connection with above statements it is to be said that the term asphalt is used to mean the residues of the distillation of crude petroleum (artificial asphalt) as well as natural asphalt, i.e., a naturally occurring mixture of bitumen and minerals, as they are used for the construction of asphalt roads, melted asphalt and so on.

The weight per cents of polyolefin are based on the weight of the bitumen and, respectively, the asphalt. With natural asphalt, however, which contains natural mineral additions the weight percents indicated are based on the total weight of this natural asphalt containing natural additives. It has been found that mixtures of the kind described above not only improve the adhesive properties of road covers and floor covers but also reduce the breaking point of the mixture and increase the breaking strength of the mixture. In addition to a high chemical resistance and an increased resistance to ageing, there results the advantage that the gripping capacity of the road cover is nearly not changed with the lapse of time so that the excellent original gripping capacity is preserved also after a longer time of road traffic on said road cover. The gripping capacity of a road cover is, as experience has shown, a factor substantially influencing the frequency of accidents.

Test results obtained on two samples of asphalt containing propylene and gravel were as follows:
Sample 1: 6.1 % binder 0.485 % polyethylene added
Sample 2: 6.1 % binder 0.35 % polyethylene added
comparison sample: 6.1 % binder no polyethylene added If the polyethylene added is expressed in percents of the sum of binder and polyethylene added, then sample 1 contains 8 percent by weight synthetic resin, whereas sample 2 contains 5.75 percent by weight synthetic resin.

The friction coefficient of both samples mentioned above and of a comparison sample containing no synthetic resin addition was determined prior to a polishing process and after a polishing process lasting 1 hour (both samples originally were smooth in view of continued travelling):

|  | friction coefficient | |
| --- | --- | --- |
|  | prior to polishing | after polishing |
| Sample 1: | 0,36 | 0,36 |
| Sample 2: | 0,36 | 0,36 |
| Comparison sample: | 0,36 | 0,32 |

It can be seen that both samples containing synthetic resin remain unchanged in its friction coefficient in spite of the polishing process, whereas the friction coefficient of the comparison sample containing no synthetic resin is markedly decreased by the polishing process. It may be concluded therefrom that the gripping capacity of road covers produced by means of mixtures containing bitumen and, respectively, asphalt and additionally polyolefins does not suffer a change, or compared to known road covers show a lower degree of change with the lapse of time so that a good original capacity is preserved.

A further essential advantage results in the fact that the polyolefin added, particularly when using reclaimed polyolefin, has an immediate stiffening effect on the mixture and thus prevents the mineral substances contained in this mixture from settling when placing this mixture at the site of application. The mineral substances, in turn, including the contaminations adhering to the reclaimed polyolefin, prevent the polyolefin particles from settling when placing the mixture in form of a cover or layer. This results in a uniform good quality of the cover or layer throughout its whole thickness.

The invention is further illustrated by the following Examples.

In the following Examples 1 to 3 and Comparison Examples A and B the following mineral fillers indicated in the following table I together with the grain size distribution were used.

Table I

| Grain size in mm | 1 ground lime stone percent by weight | 2 natural sand percent by weight | 3 basalt gravel 2/5 mm percent by weight | 4 basalt gravel ⅝ mm percent by weight |
|---|---|---|---|---|
| 0 − 0.09 | 82 | | | |
| 0.09 − 0.2 | 15 | 8 | | |
| 0.2 − 0.63 | 3 | 48 | 1 | |
| 0.63 − 2 | | 41 | 11 | |
| 2 − 5 | | 3 | 81 | 9 |
| 5 − 8 | | | 7 | 90 |
| 8 − 12.5 | | | | 1 |

As mineral additive the mixture shown in the following table II of the mineral fillers indicated in table I was used.

Table II

| | percent by weight |
|---|---|
| 1 Ground lime stone | 35 |
| 2 natural sand | 33 |
| 3 basalt gravel 2/5 | 16 |
| 4 basalt gravel ⅝ | 16 |

This mineral additives showed the grain size distribution indicated in the following table III.

Table III

| Grain size in mm | percent by weight | sum of percent by weight |
|---|---|---|
| 0 − 0.09 | 28.7 | 28.7 |
| 0.09 − 0.2 | 7.9 | 36.6 |
| 0.2 − 0.63 | 17.1 | 53.7 |
| 0.63 − 2 | 15.3 | 66.0 |
| 2 − 5 | 15.4 | 84.4 |
| 5 − 8 | 15.5 | 99.9 |
| 8 − 12.5 | 0.1 | 100.0 |

By using 100 parts by weight of this mineral additive and 9.9 parts per weight of a bituminous binder, a casting asphalt mixture was produced containing 9 percent by weight of bituminous binder. The casting asphalt was prepared by melting the bituminous binder at a temperature of approximately 280°C and then adding the mineral additive to the molten binder in increments and then thoroughly mixing the mixture for a period of 1 hour.

The bituminous binder used in Comparison Example A was a high vacuum bitumen HVB 85/95 having a softening point (ring and ball) of 85° to 95°C and a penetration of 10° at 25°C. The bituminous binder used in Comparison Example B was a mixture of said HVB 85/95 and bitumen B 45 in a weight ratio of 1 : 1, said bitumen B 45 having a softening point (ring and ball) of 55 and a penetration of 45° at 25°C.

The bitumen used in Comparison EXample A was also used in Example 1 and made up to a bituminous binder by adding 5 percent by weight, based on the total bituminous binder, of a mixture of various types of polyolefins as indicated in the following table IV (the Hostalen type polyethylenes used are produced by Farbwerke Hoechst, Germany).

Table IV

| Polyethylene (Hostalen-type) | GC | GD | GF | GM | GUR |
|---|---|---|---|---|---|
| percent by weight of total amount of polyethylenes | 3 | 7 | 10 | 20 | 60 |
| melt index $i_5$ (g/10 min) | 18 | 5 | 1,3 | 0.35 | 0 |
| mean molecular weight | $60.10^3$ | $80.10^3$ | $100.10^3$ | $200.10^3$ | $1000.10^3$ |

For dissolving, respectively, dispersing the polyethylene within the bitumen the bitumen was first molten and heated to a temperature of approximately 220°C, whereupon the polyolefin fraction of lowest mean molecular weight was added first under stirring for 5 minutes and subsequently the polyolefin fraction of higher molecular weight were individually added in the same manner so that the polyolefin fraction of mean higher molecular weight was added as the last fraction for facilitating dissolution, respectively, dispersion thereof.

The bitumen used in Comparison Example B was also used in Example 2 and made up to a bituminous binder by adding 5 percent by weight, based on the total bituminous binder, of the same mixture indicated above and by working in the same manner as indicated above for Example 1.

From the mixtures thus produced sampling cubes were produced for determining the penetration depth of a cylindrical stamp having a front face of 1 cm² at a temperature of 22° and 40°C, each for 5 hours. The results obtained are indicated in the following Table V.

Table V

| Penetration depth in mm | Comparison Example A | Comparison Example B | Example 1 | Example 2 |
|---|---|---|---|---|
| at 22 °C | 0.63 | 0.97 | 0.44 | 0.43 |
| at 40 °C | 2.70 | 11.40 | 0.90 | 1.40 |

As can be derived from the above table V the penetration depth was drastically reduced by adding polyolefins to bitumen according to the principles of the invention. The stiffening effect of the polyethylene used is, as can be derived from Comparison Example B and Example 2, the more pronounced the higher is the penetration of the bitumen used.

From the following Comparison Example C and Examples 3 and 4 it may be concluded that an amount of approximately 5 percent by weight of polyolefin mixture within the bituminous binder is on account of economic reasons sufficient to increase the stiffness and the hardness of casting asphalt. This can be derived from the following table VI.

Table VI

| Components of the casting asphalt | Comparison Example C | Example 3 | Example 4 |
|---|---|---|---|
| ground lime stone (Filler de l'Estaque) | 26 % | 26 % | 26 % |
| sand 0/5 mm | 33 % | 32,5 % | 32 % |
| gravel 0.6/4 mm | 32 % | 32 % | 32 % |
| bitumen 40/50 /softening point 48 °C (ring and ball)/ | 7 % | 9.0 % | 9.0 % |
| high vacuum bitumen HVB 93/6 | 2 % | 0 | 0 |
| polyolefin mixture of Examples 2 and 3 | 0 | 0.5 % | 1.0 % |
| mixing temperature in °C | 257 | 256 | 260 |
| penetration depth in mm stamp front face 1 cm², 40 °C, 30 minutes | 2.50 | 0.53 | 0.34 |

The above table again shows that by adding polyolefins to bitumen according to the principles of the invention the penetration depth of the casting asphalt produced can be considerably reduced. The above Table VI further shows that by increasing the amount of polyolefin used from about 5 percent by weight within the bituminous binder to about 10 percent by weight within the bituminous binder the penetration depth can only be reduced for further 0.2 mm whereas the first 5 percent by weight of polyolefin mixture reduced the penetration depth for approximately 2.0 mm, so that the most economic amount of polyolefin can be considered approximately 5 percent by weight based on total bituminous binder. This amount of 5 percent by weight of polyolefin can, as has been found, be considered the upper limit for casting asphalts because higher amounts of polyolefin mixture increase the stiffness of the mixture of bituminous binder and mineral additives to such an extent that this mixture can only be placed at the site by using wiping blades.

Essentially the same results were obtained by using waste polyethylene and reclaimed polyethylene which was collected at random. By grinding such material and by extruding the ground material to form strands of a diameter of approximately 2 mm and subsequently chaffing the strands a granulate was obtained which contained, as determined by methods known per se, 5 percent by weight of a fraction having a mean molecular weight of approximately $50.10^3$, 10 percent by weight of a fraction having a mean molecular weight of approximately $100.10^3$, 20 percent by weight of a fraction having a mean molecular weight of approximately $500.10^3$ and 65 percent by weight of a fraction having a mean molecular weight of about $800.10^3$. This material was used as indicated for Examples 2 and 3 and provided comparable results.

By further tests the Marshall stability of a material suitable for road covers, i.e., of a mixture of bitumen B 200 at the one hand and bitumen B 200 plus an addition of polyethylene at the other hand with mineral fillers was determined. The mineral additive used consisted of granite and had the following grain size distribution and composition of grain fractions:

25.0 parts by weight granite gravel grain size 5/8 mm 25.0 parts by weight granite gravel grain size 2/5 mm 21.0 parts by weight ground rock 0,09/2,0 mm
21.0 parts by weight natural sand 0,09/2,0 mm
8.0 parts by weight lime stone flour In the following examples, i.e., Comparison Example D and Examples 5 and 6, a bituminous mixture comprising 7 percent by weight of bituminous binder and 93 percent by weight of the mineral additive was prepared, noting that in Comparison Example D bitumen B 200 as such was used as a binder whereas in Examples 5 and 6 the binder used was a mixture containing 94 percent by weight bitumen B 200 and 6 percent by weight of a polyolefin mixture, noting that in Example 5 the polyolefin mixture used in Examples 1 and 2 was used whereas in Example 6 the reclaimed polyethylene mentioned above was used. The polyethylenes were dispersed or dissolved, respectively, within the bitumen at a temperature of 200°C with agitating during a period of 1 hour. The mixtures of bitumen and polyolefins as well as bitumen B 200 were mixed with the mineral additives in usual manner at a temperature of 200°C.

From the mixtures produced Marshall samples were formed as indicated in DIN 1996 whereupon these samples were tested as indicated in DIN 1996. The following results were obtained.

Table VII

| | Comparison Example D | Example 5 | Example 6 |
|---|---|---|---|
| Marshall stability in kg | 420 | 610 | 590 |

As can be seen from table VII the Marshall stability of bituminous mixtures containing polyolefin fractions was considerably increased. The somewhat less pronounced increase obtained when using reclaimed polyolefins might be contributed to a greater content in lower molecular weight polyolefins of the polyolefin mixture used.

What I claim is:

1. A process for preparing a mixture for constructional purposes, comprising the steps of mixing a composition consisting essentially of a binder material selected from the group consisting of bitumen and asphalt, with 1 to 10 percent by weight, based on the weight of the binder material of a polyolefin selected from the group consisting of polyethylene and polypropylene, wherein the binder material is heated to a liquid state and the polyolefin is finely dispersed therein, and wherein said polyolefin is a reclaimed polyolefin having various molecular weights, which is added to the binder material in the form of small particles which have a maximum dimension of more than 0.3mm and are provided with finely particulated contaminating material adhering to said small particles.

2. A process for preparing a mixture for constructional purposes, comprising the steps of mixing a composition consisting essentially of a binder material selected from the group consisting of bitumen and asphalt, with 1 to 10 percent by weight, based on the weight of the binder material, of a polyolefin selected from the group consisting of polyethylene and polypropylene, wherein the binder material is heated to a liquid state and the polyolefin in the form of small particles is finely dispersed therein, and wherein said polyolefin comprises a first polyolefin portion having a higher average molecular weight and a second polyolefin portion having a molecular weight less than that of the first polyolefin portion, said second polyolefin portion comprising reclaimed polyolefin made from waste products, serving as a solubilizer for said first polyolefin portion.

3. A process as claimed in claim 2, wherein said first polyolefin portion has a molecular weight of more than 700,000.

4. A process as claimed in claim 2, wherein said second polyolefin portion comprises a mixture of polyolefins having different molecular weights, said molecular weights extending into the range of molecular weights of the first polyolefin portion.

5. A process as claimed in claim 4, wherein said first and second polyolefin portions are added in form of molecular weight fractions having different mean molecular weights, the molecular weight of these fractions extending from a very low value up to that value of molecular weight which has the lowest molecular weight polyolefin present within the fraction having the highest mean molecular weight.

6. A process as claimed in claim 4, wherein said first and second polyolefin portions comprise a mixture of polyolefins having molecular weight fractions of different mean molecular weights, gaps being existent between the molecular weight ranges of the individual fractions, said fractions being equally distributed over the total range of molecular weights.

7. A process as claimed in claim 6, wherein a polyolefin mixture is used, the percentage of any fraction of which is increasing with increasing molecular weight of said fraction.

8. A process as claimed in claim 7, wherein said percentage increases exponentially in dependence on the molecular weight.

9. A process as claimed in claim 2, wherein said second polyolefin portion comprises aliphatic hydrocarbons serving as a solubilizer for the lowest molecular weight fraction of the polyolefins, said hydrocarbons having a boiling point above 300°C.

10. A process as claimed in claim 2, wherein said second polyolefin portion comprises a polyolefin which at least twice has undergone a heat treatment.

11. A process as claimed in claim 10, wherein said polyolefin having been subjected to at least two heat treatments is a polyolefin containing colouring matter.

12. A process as claimed in claim 2, wherein said reclaimed polyolefin has been heat treated during a disintegrating process.

13. A process as claimed in claim 2, wherein said reclaimed polyolefin is added to the binder material in the form of particles of small size, said particles being provided with finely particulated contaminating material adhering to said particles.

14. A process as claimed in claim 13, wherein each of said particles of reclaimed polyolefin is provided also in its interior with said finely particulated contaminating material.

15. A process as claimed in claim 2, wherein said polyolefin waste products are melted, then cooled and disintegrated before adding said second polyolefin to the heated binder material.

16. A process as claimed in claim 2, wherein said second polyolefin is added to the binder material in form of small particles having a maximum dimension of more than 0.3 mm.

17. A process as claimed in claim 16, wherein said second polyolefin is added to the binder material in the form of small particles selected from the group of flakes, chips or chaffs.

18. A process as claimed in claim 16, wherein said second polyolefin is added to the binder material in the form of crushed disintegrated particles.

19. A process as claimed in claim 16, wherein said second polyolefin is added to said binder material in the form of agglomerates.

20. A process as claimed in claim 16, wherein said second polyolefin is added to said binder material in the form of a granulate.

21. A process as claimed in claim 2, wherein said second polyolefin is supplied to a bath of said liquid binder material by means of an air stream which is directed onto said bath.

22. A process as claimed in claim 2, wherein mineral additives are added to said binder material simultaneously with said first and second polyolefin portions.

* * * * *